United States Patent [19]

Cherukuri et al.

[11] Patent Number: 4,794,003

[45] Date of Patent: * Dec. 27, 1988

[54] POLYVINYLACETATE BUBBLE GUM BASE COMPOSITION

[75] Inventors: Subraman R. Cherukuri, Towaco, N.J.; Gul Mansukhani, Staten Island, N.Y.

[73] Assignee: Warner-Lambert Company, Morris Plains, N.J.

[ * ] Notice: The portion of the term of this patent subsequent to Jan. 26, 2005 has been disclaimed.

[21] Appl. No.: 123,449

[22] Filed: Nov. 20, 1987

Related U.S. Application Data

[63] Continuation-in-part of Ser. No. 846,690, Apr. 1, 1986, Pat. No. 4,721,620.

[51] Int. Cl.$^4$ ............................................. A23G 3/30
[52] U.S. Cl. .......................................... 426/6; 426/3; 426/4

[58] Field of Search ......................................... 426/3-6

[56] References Cited

U.S. PATENT DOCUMENTS

| | | | |
|---|---|---|---|
| 3,984,574 | 10/1976 | Comollo | 426/4 |
| 4,352,822 | 10/1982 | Cherukuri et al. | 426/4 |
| 4,357,355 | 11/1982 | Koch et al. | 426/4 |
| 4,387,108 | 6/1983 | Koch et al. | 426/4 |
| 4,721,620 | 1/1988 | Cherukuri et al. | 426/6 |

*Primary Examiner*—Jeanette Hunter
*Attorney, Agent, or Firm*—Henry C. Jeanette; Gary M. Nath

[57] ABSTRACT

A bubble gum base composition containing a combination of two PVA polymeric materials, namely a low molecular weight component and a medium molecular weight component along with an acetylated monoglyceride having a sponification value above about 400.

36 Claims, No Drawings

POLYVINYLACETATE BUBBLE GUM BASE COMPOSITION

This is a continuation-in-part of copending Ser. No. 846,690 filed on Apr. 1, 1986, now U.S. Pat. No. 4,721,620.

The present invention relates to bubble gum base compositions and more particularly to bubble gum compositions that exhibit improved textural properties.

Bubble gum compositions generally contain a water-insoluble gum base, a water-soluble flavoring liquid and water soluble sweeteners such as sucrose and corn syrup or in sugarless gum, sorbitol, mannitol and artificial sweeteners. Also incorporated within the gum base may be plasticizers or softeners to improve film forming ability, consistency and texture of the gum. The gum base generally contains a natural rubber gum base, a synthetic rubber gum base or mixtures thereof.

Several deficiencies with conventional bubble gums have existed, notably their tendency to be sticky, exhibit bitter taste when chewed, form inconsistent films when being blown so that uniform thick bubbles are not produced and become tight when chewed.

Various efforts have been made to modify the well known bubble gum base formulations, by either the deletion of certain ingredients or the inclusion of other ingredients in each case requiring adjustment of the gum base to assure the maintenance of desired textural characteristics.

In U.S. Pat. No. 3,984,574 to Comollo a non-tack chewing gum is disclosed which contains as the preferred elastomer a low molecular weight polyisobutylene (molecular weight of 6,000 to 12,000) and/or a higher molecular weight polyisobutylene (molecular weight of 40,000 to 120,000). It is also disclosed that other elastomers may be employed in place of or together with the polyisobutylene, namely, polyisoprene, a copolymer of isobutylene and isoprene, or the copolymer of butadiene and styrene. In addition, polyvinyl acetate having a molecular weight of at least 2,000 is used in amounts up to 55% along with hydrogenated vegetable oil and animal fat added at a level of 5 to 50%. Mono and diglycerides of fatty acids are also present in amounts up to 10%. Calcium carbonate is added as a mineral filler to the various compositions proposed.

This disclosure is consistent with the earlier prior art disclosing the essential presence of mineral fillers as one of the ingredients needed to obtain non-stick properties in gum compositions and is silent about the use of triacetin or acetylated monoglycerides.

Cherukuri et al. in U.S. Pat. No. 4,352,822 discloses a non-SBR composition by use of polyisobutylene elastomers to make a bubble gum having film forming characteristics. The elastomer gum base used a combination of essential ingredients including glyceryl triacetate and acetylated monoglyceride as plasticizers, a polyterpine resin as an anti-tack agent, polyethylene wax and various other conventional chewing gum additives.

A hydrophilic-type detackifier is disclosed to be used in amounts of 5 to 60%. This agent is alleged to sorb saliva and become slippery when the gum is chewed. These materials are used even though it is known that they are incompatible with the elastomer and elastomer solvent. An example of a detackifier is a vinyl polymer, such as polyvinyl acetate, polyvinyl butyl ester and copolymers of vinyl esters and vinyl ethers having a molecular weight from about 2,000 to about 10,000 as disclosed by Cherukuri et al.

U.S. Pat. No. 4,357,355 to Koch et al is directed to a non-stick bubble gum base composition that can contain non-SBR elastomers. In particular, this patented non-adhesive bubble gum bsse composition includes a high molecular weight vinyl polymer such as polyvinyl acetate or polyvinyl alcohol, together with an emulsifier, in combination with ingredients such as an elastomer, an oleaginous plasticizer, an elastomer solvent, mineral adjuvants, fatty acids, and others. The polyvinyl acetate employed by Koch et al. has an average molecular weight of about 38,000 to about 94,000 which material is preblended with the gum base elastomers prior to incorporation of the remaining base ingredients. Koch et al. specifically disclose the presence of 5 to 25% by weight of mineral adjuvants, such as calcium carbonate and talc.

U.S. Pat. No. 4,387,108 to Koch et al. is directed to a non-stick chewing gum composition which contains the following ingredients:

| | |
|---|---|
| Elastomer | 8–30% |
| Oleaginous Plasticizer | 9–40% |
| Mineral Adjuvants | 10–15% |
| Non-toxic Vinyl Polymer | 16–32% |
| Emulsifier | 0.5–10% |
| Elastomer Solvent | 2.5–13% |

The vinyl polymer of Koch et al. has a molecular weight of from 33,000 to about 94,000 and includes PVA compounds having molecular weights on the order of 10,000 to 40,000 as well as 50,000 to 75,000.

While the prior art compositions have been effective in making non-stick or tack free bubble gums these formulations have either (1) used low molecular weight PVA in combination with other elastomers and fillers to aid film forming ability or (2) have employed high molecular weight PVA with modifying - expansion agents, such as triacetin, likewise in combination with other elastomers and fillers. The first formulations have not been fully effective, have not been consistent film formers and have separated into phases on storage, that is elastomer and elastomer solvent in one phase and the PVA and sorbed waxes and fats in another phase. In contrast, the second type of high molecular weight PVA formulations contained expansion agents to aid in film formation, and in particular triacetin. This plasticizer resulted in a bitter taste when the gum was chewed and upon chewing resulted in a tight chew causing inadequate bubble formation.

In accordance with the present invention, a bubble gum base as well as a bubble gum composition have been discovered which have excellent initial and extended chew properties, forms an essentially continuous film, maintains the bubble shape after the bubble has been formed and resists ingredient separation. These aspects are accomplished without the use of a filler material, although fillers may be added if desired.

These textural properties have been unexpectedly produced from a unique combination of non-SBR elastomers, a combination of at least two different polyvinyl acetate polymeric materials and an acetylated monoglyceride which has a sponification value above about 400.

In a preferred embodiment, the bubble gum base composition, comprises by weight percent (a) about 0.5% to about 30% non-SBR elastomer selected from the group consisting of synthetic gums, synthetic elastomers, natural gums, natural elastomers and mixtures thereof, (b) a combination of two polyvinyl acetate polymeric materials selected from (1) up to 14% of a polyvinyl acetate having a low molecular weight of about 12,000 to about 16,000 and (2) up to 35% of a polyvinyl acetate having a medium molecular weight from about 35,000 to 55,000, and (c) about 5% to about 12% acetylated monoglyceride having a sponification value above about 400.

In another preferred embodiment, a process for preparing a bubble gum base composition has been developed which comprises (A) providing the following ingredients in amounts expressed in percent by weight;
 (a) about 0.5% to about 30% non-SBR elastomer selected from the group consisting of synthetic gums, synthetic elastomers, natural gums, natural elastomers and mixtures thereof,
 (b) a combination of two polyvinyl acetate polymeric materials selected from
  (1) up to 14% of a polyvinyl acetate having a low molecular weight of about 12,000 to about 16,000 and
  (2) up to 35% of a polyvinyl acetate having a medium molecular weight of about 45,000 to 55,000, and
 (c) about 5% to about 12% acetylated monoglyceride having a sponification value above about 400, and
 (d) remainder of a material selected from the group consisting of elastomer solvent, emulsifiers, plasticizers, waxes and mixtures thereof,
(B) Agitating said elastomer by mixing.
(C) Adding the elastomer solvent to the elastomer of step B to form a first mixture,
(D) Adding to said first mixture the combination of polyvinyl acetate polymer materials to form a second mixture, and
(E) Adding to said mixture the remainder of said ingredients wherein all of the ingredients are mixed under agitation to prepare a bubble gum base composition.

In yet another preferred embodiment there is provided a bubble gum base composition, which comprises in weight percent:
 (a) about 0.5% to about 30% non-SBR elastomer selected from the group consisting of synthetic gums, synthetic elastomers, natural gums, natural elastomers and mixtures thereof,
 (b) not more than about 2% of a SBR elastomer;
 (c) an effective amount of a combination of two polyvinyl acetate polymeric materials selected from:
  (1) not more than 14% of a polyvinyl acetate having a low molecular weight of about 12,000 to about 16,000; and
  (2) not more than 35% of a polyvinyl acetate having a medium molecular weight of about 35,000 to 55,000;
wherein the polyvinyl acetate polymeric materials are present in a mole ratio of 1:2 to 1:45 based on the low molecular weight polyvinyl acetate to the medium molecular weight polyvinyl acetate;
 (d) about 5% to about 12% acetylated monoglyceride having a sponification value above about 400; and
 (e) optionally, an effective amount of a material selected from the group consisting of elastomer solvents, emulsifiers, plasticizers, waxes, fillers and mixtures thereof.

Still another preferred embodiment provides a process for preparing a bubble gum composition which comprises:

(A) providing the following ingredients in amounts expressed in percent by weight:
 (a) about 0.5% to about 30% non-SBR elastomer selected from the group consisting of synthetic gums, synthetic elastomers, natural gums, natural elastomers and mixtures thereof;
 (b) not more than about 2% of a SBR elastomer;
 (c) an effective amount of a combination of two polyvinyl acetate polymeric materials selected from
  (1) not more than 14% of a polyvinyl acetate having a low molecular weight of about 12,000 to about 16,000 and
  (2) not more than 35% of a polyvinyl acetate having a medium molecular weight of about 35,000 to 55,000,
wherein the polyvinyl acetate polymeric materials are present in a mole ratio of 1:2 to 1:45 based on the low molecular weight polyvinyl acetate to the medium molecular weight polyvinyl acetate;
 (d) about 5% to about 12% acetylated monoglyceride having a sponification value above about 400; and
 (e) remainder of a material selected from the group consisting of elastomer solvents, emulsifiers, plasticizers, waxes, fillers and mixtures thereof;
(B) agitating said elastomer by mixing;
(C) adding the elastomer solvent to the elastomer of step (B) to form a first mixture;
(D) adding to said mixture the combination of polyvinyl acetate polymer materials to form a second mixture; and
(E) adding to said mixture the remainder of said ingredients wherein all of the ingredients are mixed under agitation to prepare a bubble gum based composition.

The elastomers useful in the present gum base composition include those non styrene butadiene rubber (non-SBR) elastomers normally included in gum bases. Illustrative elastomers include synthetic gums or elastomers such as polyisobutylene and isobutylene-isoprene copolymers; natural gums or elastomers such as chicle, natural rubber, jelutong, balata, guttapercha, lechi caspi, sorva or mixtures thereof. Among these, polyisobutylene, isobutylene-isoprene copolymer or mixtures thereof are preferred.

A preferred elastomer is a polyisobutylene which has an average molecular weight of 45,000 to 68,000 (determined by the Flory method). The low molecular weight polyisobutylene component may be used as a single polyisobutylene material or combination of different polyisobutylene material or combination of different polyisobutylene compounds provided each has a molecular weight within the range defined. The use of a combination of elastomers has been found beneficial to achieve a bubble gum composition having the desired elasticity and texture.

The non-SBR elastomer content employed is in an amount of about 0.5 to about 30%, and preferably about 5 to about 20% by weight of the gum base. When the total amount of elastomer is below 0.5% the base composition lacks elasticity, chewing texture, and cohesiveness whereas at amounts above 30% the formulation is hard and rubbery.

As stated above, in one preferred embodiment the base compositions contain a SBR elastomer in amounts of not more than about 2% by weight of the base composition with about 0.5% to about 1.5% by weight being preferred and about 0.5% to about 1.0% by weight being most preferred. Generally, the SBR elastomers have a bound styrene content of about 23% to about 48% by weight of the elastomer with about 24% to about 48% being preferred. The addition of not more than about 2% by weight of SBR elastomer to the gum base composition improves the bubble formation, particularly when SBR elastomers having high contents of bound styrene are used, such as bound styrene in amounts of about 40% to about 48% by weight of the elastomer, and preferably about 48% by weight. Higher amounts of SBR elastomers in the base composition are incompatible with the PVA polymers and result in a loss of cohesiveness.

Polyvinyl acetate (PVA) is an essential ingredient in the bubble gum base compositions of this invnntion. The polyvinyl acetate used must comprise a combination of two different types of PVA. The first component is a low molecular weight material having about 12,000 to about 16,000 mean average molecular weight. Such material will have a preferred viscosity of 14 to 16 seconds (ASTM D1200-82 using a Ford cup viscosity procedure). This low molecular weight component is used in amounts up to 14% by weight of the gum base, and preferably from about 5% to about 12% by weight. The second PVA component is a medium molecular weight variety having a mean average molecular weight of about 35,000 to about 55,000. Such material will have a preferred viscosity of 35 to 55 seconds (ASTM designation D1200-82 using a Ford cup viscometer procedure.) This medium molecular weight component is used in amounts up to 35% by weight of the gum base and preferably from about 25% to about 35% by weight. It has been found that the use of a blend of these two PVA components is essential to prepare a bubble gum base that results in a gum composition that has good film forming properties and maintenance of a thick bubble shape. In addition to the required presence of these components, the components must also be present in a particular ratio. In particular the mole ratio of the low molecular weight PVA to the medium molecular weight PVA should be from 1:2 to 1:45. Lower amounts of low molecular weight component result in thicker films that are tight and unable to form effective bubbles. Higher amounts of low molecular weight component form thin bubble films that lack elasticity.

As an optional embodiment of this invention, it is possible to employ small amounts of high molecular weight PVA in combination with the low and medium molecular weight components. The useable high molecular weight PVA may be used in amounts of 0 to 5% by weight of the base and has a mean average molecular weight of 65,000 to 95,000. Amounts above 5% result in a tight gum chew character and are unable to form adequate bubble-films in these formulations.

In addition to the critical PVA constituents, it has been found essential to employ a particular mild plasticizer, namely an acetylated monoglyceride having a sponification value above about 400 and preferably between about 430 and about 470. Additionally the acetylated monoglyceride has a percent acetylation above 90%, a hydroxyl value below 10 and a Reichert Meissl value above 150 (Food Chemical Codex(FCC) III/P508 and the revision by AOCS). Acetylated monoglycerides having lower sponification values are not effective in the formulations of this invention. Examples of unsuitable compounds include acetylated monoglycerides having sponification values of 278 to 292, 316 to 331, and 370 to 380. The use of this particular acetylated monoglyceride results in a plasticized bubble gum base that may be formed without use of known bitter PVA plasticizers, namely triacetin. The acetylated monoglycerides of this invention are used in amounts of about 5% to about 12% and preferably about 6.5% to about 10%.

In addition to the foregoing essential ingredients, the bubble gum base compositions of this invention includes a variety of traditional ingredients, such as eaastomer solvent, emulsifiers, plasticizers, waxes and mixtures thereof.

The bubble gum base composition elastomer solvents aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood or gum rosin, pentaerythritol ester of wood or gum rosin, glycerol ester of partially dimerized rosin, glycerol ester of polymerized rosin, glycerol ester of tall oil rosin, glycerol ester of wood or gum rosin and partially hydrogenated wood or gum rosin and partially hydrogenated methyl ester of rosin and mixtures thereof; terpene resins including polyterpene and polymers of alpha-pinene or beta-pinene and mixtures thereof; and mixtures thereof. The elastomer solvent may be employed in an amount ranging from about 2% to about 18% and preferably about 7% to about 12% by weight of the gum base. Amounts below about 2% cause the unacceptable chew characteristics. Amounts above 18% cause a soft product to be formed which results in a product which sticks to the face.

Useful optional emulsifiers in the formulation of this invention include glyceryl monostearate, lecithin, fatty acid monoglycerides, diglycerides, propylene glycol monostearate and mixtures thereof. Glyceryl monostearate is most preferred. When emulsifiers are absent, the formulation has poor stability and lacks acceptable texture. It is believed that the emulsifier aids in bringing the normally immiscible constitunnts together in such a way that they form a single finely dispersed stable system. This emulsifier improves hydrophilic character. The emulsifier is employed in amounts of about 2% to about 10% and preferably about 4% to about 8% by weight of the base. It has been found that some emulsifiers conventionally used result in the formation of unacceptable base formulations. Exemplary non-useable emulsifiers include glyceryl triacetate.

The gum base formulation preferably employs a wax material. The waxes have been found to soften the rubber elastomer mixture and improve elasticity of the chew character. The waxes employed are preferably microcrystalline wax, natural wax, petroleum wax, paraffin wax and mixtures thereof. Useful amounts are from about 2% to about 25% by weight with about 5% to about 18% by weight being preferred and from about 7% to about 12% by weight of the gum base composition being most preferred. The waxes employed herein preferably have a melting point above about 125° F. in order to obtain a consistent chew property. Use of waxes having lower melting points increases tackiness.

A variety of traditional ingredients such as plasticizers or softeners may optionally be added. Such materials are optional and not essential in the present formulation. Such materials include hydrogenated vegetable oils (e.g., hydrogenated cottonseed oil, partially hydrogenated soya bean oil, mixtures thereof, and the like), lanolin, stearic acid, sodium stearate, potassium stearate, glycerine and the like and mixtures thereof. Such materials when incorporated into the gum base obtain a variety of desirable textures and consistency properties. These individual materials are generally employed in amounts of about 6% to about 20% by weight and preferably in amounts of from about 9% to about 17% by weight of the gum base composition. Because of the low molecular weight of these compounds, they are able to penetrate the fundamental structure of the base making it plastic and less viscous.

A unique feature of the inventive formulations is their ability to form cohesive products without the use of filler-texturizing agents. Such agents have been described in the prior art as necessary to impart good lubricant and flavor release properties to non-stick gum base products. Because of applicants unique combination of ingredients the inventive formulations are prepared in the essential absence of filler-texturizing agents. The ability to prepare a PVA containing bubble gum without the essential presence of a filler is unexpected. Prior PVA formulations required the presence of the filler to lend cohesiveness to the base to avoid phase separation of the elastomer/elastomer solvent from the PVA and sorbed oils and waxes. In the absence of the filler this separation has been noted to occur almost immediately upon completion of preparing the normal base compositions.

Once the bubble gum base is prepared and is ready for blending into a bubble gum composition, the optional filler-texturizing agent may be added in an amount up to 40% by weight. Examples of fillers suitable for use include, but are not limited to, calcium carbonate, aluminum hydroxide, alumina, magnesium carbonate, dicalcium phosphate, talc ($3MgO.4SiO_2H_2O$), magnesium trisilicate, magnesium hydroxide, aluminum silicates, silica gel, organic fillers and combinations thereof. Calcium carbonate is preferred.

The manner in which the base constituents are blended is not critical and is performed using standard techniques and equipment known to those skilled in the art. In a typical embodiment the elastomer composition is agitated with an elastomer solvent and/or plasticizers, and/or emulsifiers for a period of about 1 minute to about 30 minutes. Once initial mixing is complete the PVA components are blended into the first mixtuee. While it is not essential it is preferred to add the medium molecular weight PVA prior to addition of the low molecular weight component. In this manner uniform blending can be achieved without the creation of isolated pockets of PVA within the elastomer. The remaining base constituents may now be added in bulk, incrementally or stepwise while the resulting mixture is blended for a further equivalent period of time.

The present bubble gum base may be formulated into a variety of bubble gum products utilizing standard procedures and equipment. A bubble gum composition may be prepared by combining conventional ingredients such as sweeteners, flavors, colorants and the like. Tee amount of gum base employed will vary depending on such factors as the type of base used, consistency desired and other components used to make the final product. In general, amounts from about 5% to 60% by weight of the final gum base composition are acceptable with about 10% to about 60% by weight being suitable and about 15% to about 45% by weight being preferred and about 15% to about 25% being most preferred.

The sweetening agent may be selected from a wide range of materials including water-soluble agents, water-soluble artificial sweeteners, and dipeptide based sweeteners, including mixtures thereof. Without being limtted to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweeteners selected for a particular bubble gum. This amount will normally be 0.001% to about 90% by weight when using an easily extractable sweetener. The water-soluble sweeteners described in category A above, are preferably used in amounts of about 25% to about 75% by weight, and most preferably from about 50% to about 65% by weight of the final bubble gum composition. In contrast, the artificial sweetener described in categories B and C are used in amounts of about 0.005% to about 5.0% and most preferably about 0.05% to about 2.5% by weight of the final bubble gum composition. These amounts are ordinarily necessary to achieve a desired level of sweetness independent from the flavor level achieved from flavor oils.

Flavoring agents well known to the bubble gum art may be added to the chewing gum compositions of the instant invention. These flavoring agents may be chosen from synthetic flavoring liquids and/or oils derived from plants leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 2.0% by weight of the final chewing gum composition are usable with amounts of about 0.8% to about 1.5% being preferred.

The bubble gum formulations are prepared by conventional methods. An illustrative process involves first melting the gum base at a temperature from about 70° to about 120° C. and mixing the gum base in a kettle with a liquid softener and/or a emulsifier for 2 to 8 minutes. To this mixture ⅔ to ¾ of the sugar ingredients and colors are added and mixing is continued for 1 to 4 minutes. To this mixture the remaining sugar ingredients are added and while mixing is continued, the flavoring agent is slowly added. Mixing is maintained for 1 to 4 minutes. To this mixture a humectant can be added and mixing is continued for 1 to 4 minutes. The gum is discharged from the kettle and formed into its desired shape such as strips, slabs, chunks, ball ropes and/or center filled.

The following example is given to illustrate the invention, but is not deemed to be limiting thereof. All percentages given throughout the specification are based upon weight unless otherwise indicated, percentages of base components are by weight of the base, whereas bubble gum composition components are by weight of the final chewing gum formulation.

EXAMPLE 1

This example demonstrates the formation of a bubble gum base according to this invention. The composition of this example contains an SBR elastomer as well as a non-SBR elastomer.

The SBR copolymer is added to a preheated kettle and softened. The non-SBR elastomer (polyisobutylene) is then added to the kettle and the elastomers are mixed for 3 minutes under high shear until the mass reaches a temperature of 190° F. To this mass is added an elastomer solvent and mixing continued for 5 minutes. To this first mixture is added in sequence while mixing is continued the medium molecular weight PVA, low molecular weight PVA, waxes, plasticizer, and acetylated monoglyceride having a sponification value above 400. The final mass is blended for about 30 minutes. The final temperature should range from 160° F. to 210° F. The molten mass is discharged from the kettle and put into coated pans. The base is allowed to cool and harden before depanning. The ingredients are recited in Table I.

TABLE I

| Ingredient | % by wt. of Composition |
| --- | --- |
| SBR Copolymer | 0.667 |
| Polyisobutylene | 8.000 |
| Glycerol ester of polymerized rosin | 0.600 |
| Glycerol ester of partially hydrogenated wood or gum rosin | 8.000 |
| PVA (12,000–16,000 MW) | 12.000 |
| PVA (35,000–55,000 MW) | 12.000 |
| Softeners | 9.660 |
| Glyceryl monostearate | 8.000 |
| Filler | 25.500 |
| Lecithin | 0.060 |
| Paraffin wax | 9.000 |
| Acetylated monoglyceride | 6.500 |

EXAMPLE 2

This example demonstrates the formation of a bubble gum composition according to this invention using the gum base formulation of Example 1.

The formulation was prepared by first melting the gum base at a temperature from 70° C. to 100° C. and mixing the gum base in a kettle with the emulsifier and corn syrup. Mixing is continued for approximately 2 minutes to obtain a homogeneous mixture. To this mixture is added the remaining ingredients of Table II and mixing continued for approximately 7 minutes.

The gum is discharged from the kettle and formed into chunks and conditioned to room temperature.

The bubble gum formulation was subjected to test panel studies with multiple panelists. The results demonstrated that the bubble gum formulations of this invention exhibited good bubble formation, non-stick to face properties, enhanced chew character and flavor taste, that is lack of bitterness.

TABLE II

| Ingredients | % by wt. of Composition |
| --- | --- |
| Gum base | 17.4 |
| Filler | 6.0 |
| Emulsifier | 0.6 |
| Sugar | 50.875 |
| Corn syrup | 22.5 |
| Flavor | 0.7 |
| Softeners | 1.375 |
| Color | 0.05 |
| Lecithin | 0.5 |

The invention thus being described, it will be obvious that the same may be varied in many ways. Such variations are not to be regarded as a departure from the spirit and scope of the invention and all such modffications are intended to be included within the scope of the claims.

What is claimed is:

1. A bubble gum base composition, which comprises in weight percent:
   (a) about 0.5% to about 30% non-SBR elastomer selected from the group consisting of synthetic gums, synthetic elastomers, natural gums, natural elastomers and mixtures thereof;
   (b) not more than about 2% of a SBR elastomer;
   (c) an effective amount of a two polyvinyl acetate polymeric materials selected from:
      (1) not more than 14% of a polyvinyl acetate having a low molecular weight of about 12,000 to about 16,000; and
      (2) not more than 35% of a polyvinyl acetate having a medium molecular weight of about 35,000 to 55,000;
      wherein the polyvinyl acetate polymeric materials are present in a mole ratio of 1:2 to 1:45 based on the low molecular weight polyvinyl acetate to the medium molecular weight polyvinyl acetate;
   (d) about 5% to about 12% acetylated monoglyceride having a sponification value above about 400; and
   (e) optionally, an effective amount of a material selected from the group consisting of elastomer solvents, emulsifiers, plasticizers, waxes, fillers and mixtures thereof.

2. The bubble gum base composition of claim 1 which additionally contains a material selected from the group consisting of elastomer solvent, emulsifiers, plasticizers, waxes, fillers and mixtures thereof.

3. The bubble gum base composition of claim 1 wherein there is additionally included a filler.

4. The bubble gum base composition of claim 1 wherein the non-SBR elastomer is present in an amount of about 5% to about 20%.

5. The bubble gum base composition of claim 1 wherein the polyvinyl acetate polymeric materials is present in a mole ratio of 1:2 to 1:45 based on the low molecular weight PVA to the medium molecular weight PVA.

6. The bubble gum base composition of claim 1 wherein the low molecular weight PVA is present in an amount of about 5% to about 12%.

7. The bubble gum base composition of claim 1 wherein the medium molecular weight PVA is present in an amount of about 25% to about 35%.

8. The bubble gum base composition of claim 1 wherein the acetylated monoglyceride is present in an amount of about 6.5% to about 10%.

9. The bubble gum base composition of claim 1 wherein the acetylated monoglyceride has a sponification value between about 430 and about 470.

10. The bubble gum base composition of claim 2 wherein the elastomer solvent is present in the amount of aabout 2% to about 18% and wherein the elastomer solvent is selected from the group consisting of pentaerythritol ester of partially hydrogenated wood or gum rosin, glycerol ester of partially dimerized rosin, glycerol ester of polymerized rosin, glycerol ester of tall oil rosin, glycerol ester of wood or gum rosin and partially hydrogenated wood or gum rosin and partially hydrogenated methyl ester of rosin and mixtures thereof; terpene resins including polyterpene and polymers of alpha-pinene or beta-pinene and mixtures thereof; and mixtures thereof.

11. Th bubble gum base composition of claim 10 wherein the elastomer solvent is present in an amount of about 7% to about 12%.

12. The bubble gum base composition of claim 2 wherein the emulsifier is present in the amount of about 2% to about 10% and wherein the emulsifier is selected from the group consisting of glycerol monostearate, lecithin, fatty acid monoglycerides, diglycerides, propylene glycol monostearate and mixtures thereof, 13. The bubble gum base composition of claim 12 wherein the emulsifier is present in the amount of about 4% to about 8%.

14. The bubble gum base composition of claim 2 wherein the waxes have a melting point above about 125° F. and are present in the amount of about 2% to about 25% and wherein the waxes are selected from the group consisting of microcrystalline wax, natural wax, petroleum wax, paraffin wax and mixtures thereof.

15. The bubble gum base composition of claim 14 wherein the waxes are present in the amount of about 7% to about 12%.

16. The bubble gum base composition of claim 2 wherein the plasticizer is present in the amount of about 6% to about 20% and wherein the plasticizer is selected from hydrogenated vegetable oils, partially hydrogenated vegetable oils, hydrogenated animal fats, partially hydrogenated animal fats, cocoa butter and mixtures thereof, and said animal fats are selected from tallow, lard and mixtures thereof.

17. The bubble gum base composition of claim 16 wherein said vegetable oils are selected from soybean oil, cottonseed oil, corn oil, peanut oil, palm oil and mixtures thereof and said animal fats are selected from tallow, lard and mixtures thereof.

18. The bubble gum base composition of claim 16 wherein the plasticizer is present in the amount of about 9% to about 17%.

19. The bubble gum base composition of claim 1 wherein no filler is present.

20. A bubble gum composition which when chewed exhibits no bitterness, and has thick bubbles which comprises: a flavoring agent and a bubble gum base which comprises in weight percent:
(a) about 0.5% to about 30% non-SBR elastomer selected from the group consisting of synthetic gums, synthetic elastomers, natural gums, natural elastomers and mixtures thereof;
(b) not more than about 2% of a SBR elastomer;
(c) an effective amount of a combination of two polyvinyl acetate polymeric materials selected from
(1) not more than 14% of a polyvinyl acetate having a low molecular weight of about 12,000 to about 16,000 and
(2) not more than 35% of a polyvinyl acetate having a medium molecular weight of about 35,000 to 55,000,
wherein the polyvinyl acetate polymeric materials are present in a mole ratio of 1:2 to 1:45 based on the low molecular weight polyvinyl acetate to the medium molecular weight polyvinyl acetate;
(d) about 5% to about 12% acetylated monoglyceride having a sponification value above about 400; and
(e) optionally, an effective amount of a material selected from the group consisting of elastomer solvents, emulsifiers, plasticizers, waxes, fillers, and mixtures thereof.

21. The bubble gum composition of claim 20 wherein the base additionally contains a material selected from the group consisting of elastomer solvent, emulsifiers, plasticizers, waxes, fillers and mixtures thereof.

22. The bubble gum composition of claim 20 wherein the base additionally contains a filler.

23. The bubble gum composition of claim 20 wherein the non-SBR elastomer is present in an amount of about 5% to about 20%.

24. The bubble gum composition of claim 20 wherein the polyvinyl acetate polymeric materials are present in a mole ratio of 1:2 to 1:45 based on the low molecular weight PVA to the medium molecular weight PVA.

25. The bubble gum composition of claim 20 wherein the low molecular weight PVA is present in an amount of about 5% to 12%.

26. The bubble gum composition of claim 20 wherein the medium molecular weight PVA is present in an amount of about 25% to 35%.

27. The bubble gum composition of claim 20 wherein the acetylated monoglyceride is present in an amount of about 6.5% to about 10%.

28. The bubble gum composition of claim 20 wherein the acetylated monoglyceride has a sponification value between about 430 and 470.

29. The bubble gum composition of claim 20 wherein the flavoring agent is present in the amount of about 0.05% to about 2.0% by weight.

30. The gum composition of claim 20 wherein the flavoring agent is selected from natural or synthetic flavoring agents.

31. The bubble gum composition of claim 20 wherein the bubble gum base is present in the amount of about 10% to about 60% by weight.

32. The bubble gum composition of claim 20 additionally containing a material selected from the group consisting of natural or synthetic flavors, sweeteners, coloring agents and mixtures thereof.

33. The bubble gum composition of claim 20 wherein the flavoring agent is selected from the group consisting of peppermint oil, spearmint oil, cinnamon oil, oil of wintergreen, bubble flavor, fruit flavors and mixtures thereof.

34. The bubble gum composition of claim 32 containing a sweetening agent selected from the group consisting of water-soluble sweetening agents, water-soluble artificial sweeteners, dipeptide based sweeteners and mixtures thereof.

35. A process for preparing a bubble gum composition which comprises:
(A) providing the following ingredients in amounts expressed in percent by weight:

(a) about 0.5% to about 30% non-SBR elastomer selected from the group consisting of synthetic gums, synthetic elastomers, natural gums, natural elastomers and mixtures thereof;
(b) not more than about 2% of a SBR elastomer;
(c) an effective amount of a combination of two polyvinyl acetate polymeric materials selected from
  (1) not more than 14% of a polyvinyl acetate having a low molecular weight of about 12,000 to about 16,000 and
  (2) not more than 35% of a polyvinyl acetate having a medium molecular weight of about 35,000 to 55,000,
wherein the polyvinyl acetate polymeric materials are present in a mole ratio of 1:2 to 1:45 based on the low molecular weight polyvinyl acetate to the medium molecular weight polyvinyl acetate;
(d) about 5% to about 12% acetylated monoglyceride having a sponification value above about 400; and
(e) remainder of a material selected from the group consisting of elastomer solvents, emulsifiers, plasticizers, waxes, fillers and mixtures thereof;
(B) agitating said elastomer by mixing;
(C) adding the elastomer solvent to the elastomer of step (B) to form a first mixture;
(D) adding to said mixture the combination of polyvinyl acetate polymer materials to form a second mixture; and
(E) adding to said mixture the remainder of said ingredients wherein all of the ingredients are mixed under agitation to prepare a bubble gum based composition.

36. The process of claim 35 wherein the medium molecular weight PVA is mixed into the mixture prior to addition of the lower molecular weight PVA.

* * * * *

UNITED STATES PATENT AND TRADEMARK OFFICE
CERTIFICATE OF CORRECTION

PATENT NO. : 4,794,003
DATED : December 27, 1988
INVENTOR(S) : Subraman R. Cherukuri, Gul Mansukhani It is certified that error appears in the above-identified patent and that said Letters Patent is hereby corrected as shown below:

Column 2, Line 4:  Delete the word "bsse" and insert the word "base".
Column 2, Line 29: Delete the number 33,000 and insert the number 3,000.
Column 5, Line 16: Delete the word "invnntion" and insert the word "invention".
Column 5, Line 48: Delete the Capital Y in emploY and insert a small "y".
Column 6, Line 9:  Delete the word "eaastomer" and insert the word "elastomer".
Column 7, Line 47: Delete the word "mixtuee" and insert the word "mixture".
Column 7, Line 61: Delete the word "Tee" and insert the word "The".
Column 8, Line 5:  Delete the word "limtted" and insert the word limited.
Column 11, Line 6: Delete the word "aabout" and insert the word "about".
Column 11, Line 17: Insert the letter "e" to the "Th" at the beginning of the sentence.

Signed and Sealed this

Second Day of May, 1989

*Attest:*

DONALD J. QUIGG

*Attesting Officer*     Commissioner of Patents and Trademarks